Dec. 29, 1942.    J. B. FENDER    2,306,720
FILTERING PLANT
Filed Feb. 14, 1941    3 Sheets-Sheet 1

J. B. Fender
INVENTOR.
BY  *Knowles*
ATTORNEYS.

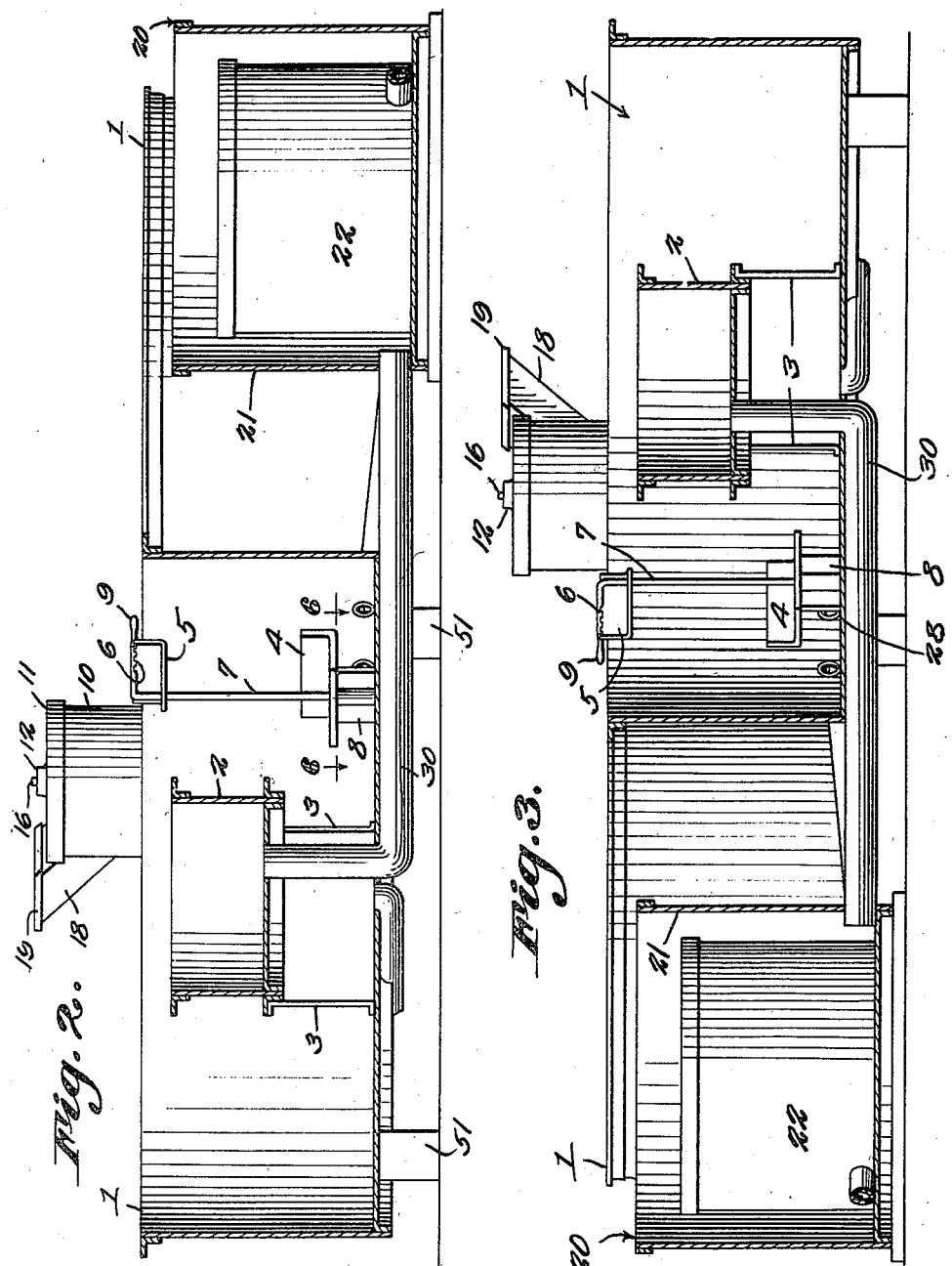

Dec. 29, 1942.  J. B. FENDER  2,306,720
FILTERING PLANT
Filed Feb. 14, 1941   3 Sheets-Sheet 3
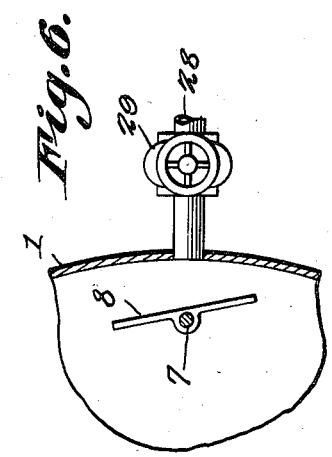
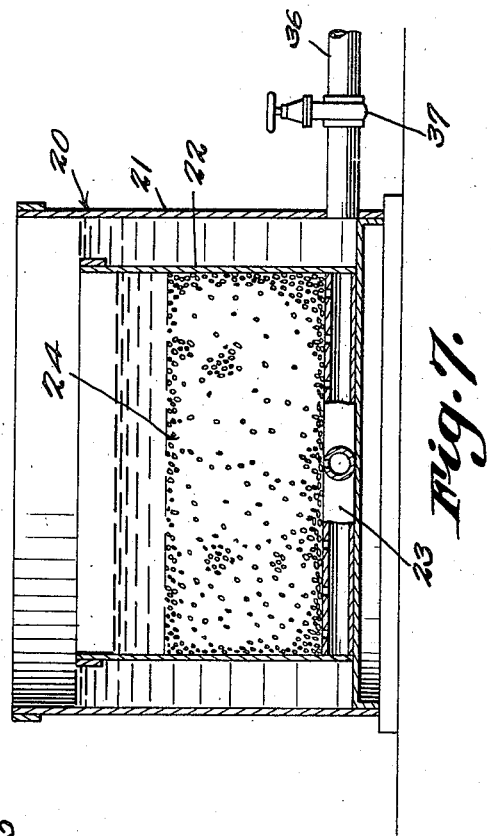
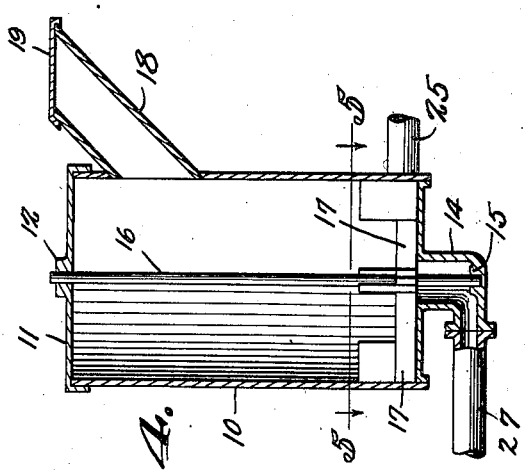
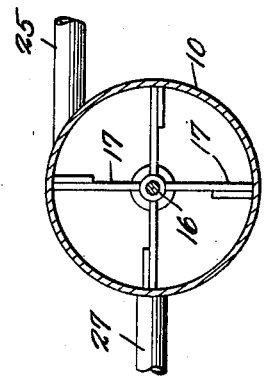
J. B. Fender
INVENTOR.
ATTORNEYS.

Patented Dec. 29, 1942

2,306,720

UNITED STATES PATENT OFFICE 2,306,720

FILTERING PLANT

John Brown Fender, Kaufman, Tex.

Application February 14, 1941, Serial No. 378,989

2 Claims. (Cl. 210—16)

This invention aims to provide novel means for handling water, during the settling, chemical treatment and filtration thereof, novel means being supplied for washing out the apparatus upon occasion.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a section on the line 5—5 of Fig. 4;

Fig. 6 is a section on the line 6—6 of Fig. 2;

Fig. 7 is a section on the line 7—7 of Fig. 1.

Figure 1:
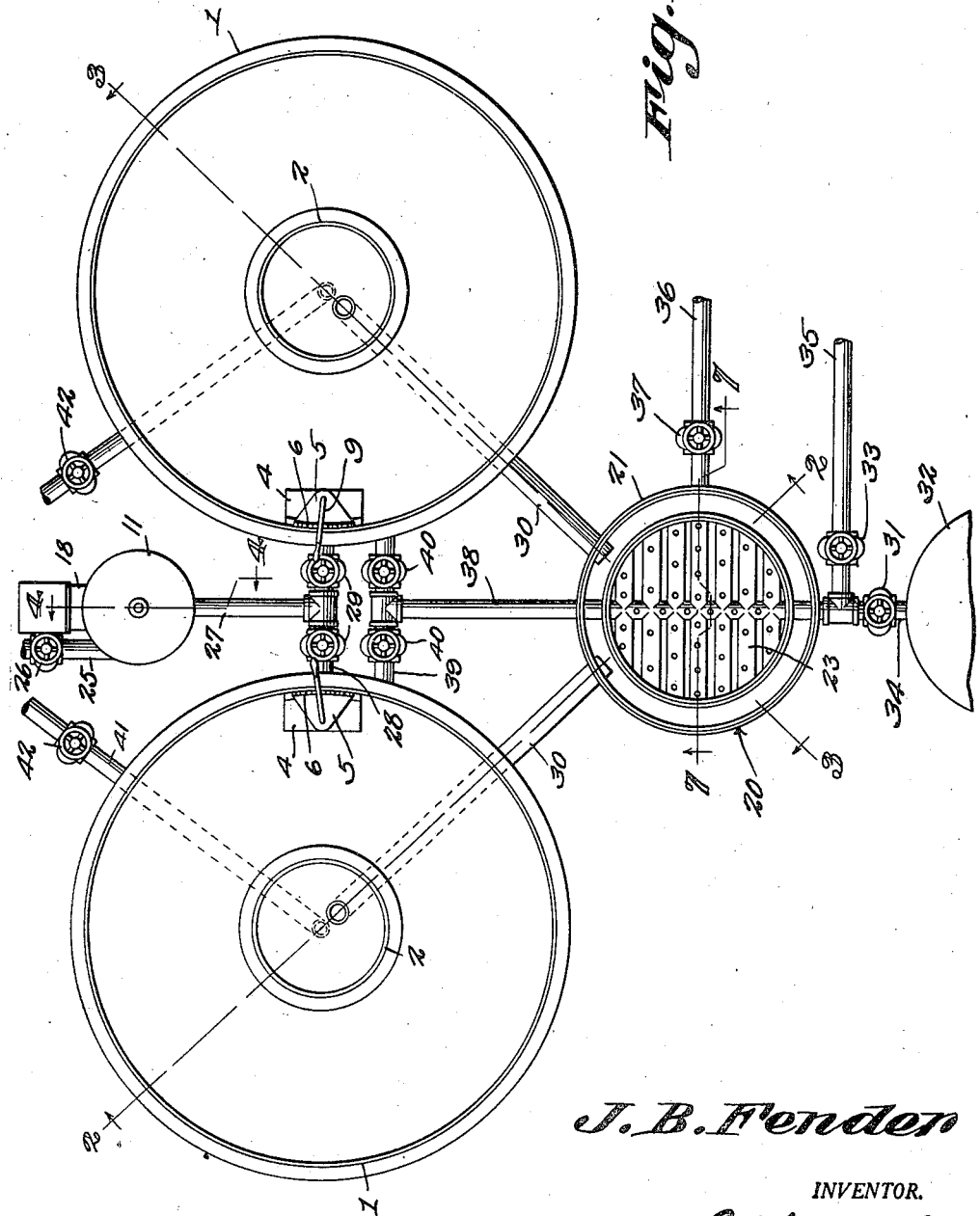
Fig. 1 shows in top plan, a device constructed in accordance with the invention.

In carrying out the invention, there is provided a plurality of circular settling basins 1, supported on legs 51. Circular check tanks 2 are located in the basins 1, at the centers thereof. The check tanks 2 are supported from the bottoms of the basins 1 on legs 3. The check tanks 2 are much smaller in diameter than the settling basins 1 and are of less height than the settling basins, the tops of the check tanks being disposed below the tops of the settling basins.

Lower bearings 4 are located within the basins 1 and are secured to the side walls of the basins, near the bottoms of the basins. Upper bearings 5 are located within the basins 1, above the lower bearings 4 and are secured to the side walls of the basins. The bearings 4 and 5 may be angle members. The vertical flanges of the upper bearings 5 extend upwardly above the upper edges of the basins 1 and are provided with keeper notches 6. The bearings 4 and 5 of one basin 1 are disposed closely adjacent to the bearings of the other basin, the bearings being disposed on the extreme inner portions of the basins, as shown in Fig. 1, to avoid the use of long connecting conduits between the basins.

Vertical shafts 7 are mounted to rotate in the bearings 4 and 5. Baffles 8 are secured intermediate their ends to the lower portions of the shafts 7 and are disposed closely adjacent to the walls of the basins 1, as Fig. 6 will show. The baffles 8 are interposed between the lower bearings 4 and the bottoms of the basins 1, and, therefore, hold the shafts 7 against upward movement, and for rotation in the bearings 4 and 5. At their upper ends, the shafts 7 are supplied with angularly disposed handles 9 which have resiliency enough so that they can be sprung into and out of the keeper notches 6 in the upper edges of the vertical flanges of the upper bearings 5.

A cylindrical, vertical, chemical receiver 10 is disposed between the basins 1 and is surmounted by a cap 11, which may be removable. The cap 11 has a central bearing 12. An outlet elbow 14 is connected to the bottom of the chemical receiver 10 and has an internal bearing 15.

A shaft 16 is journaled for rotation in the bearings 12 and 14. Paddle arms or agitators 17 are secured to the shaft 16 and work on the bottom of the receiver 10. An inlet chute 18 is secured to the receiver 10, near the upper end thereof, and is provided with a removable closure 19.

A filter 20 is located opposite to the receiver 10 and comprises a drum-like body 21. A circular tank 22 is disposed within the filter body 21 and is of less diameter than the filter body, and is supported on the bottom of the body. The tank 22 is of less height than the body 21. Parallel outlet tubes 23 are located on the bottom of the tank 22 and are perforated to receive water. A quantity of sand 24, or other filtering material, is disposed in the tank 22, on top of the outlet tubes 23.

Water under pressure enters the chemical receiver 10 by way of a tangential pipe 25 located near the bottom of the receiver and is treated, for any desired purpose, by suitable material (not shown) in the receiver. The treated water, proceeding through the pipe 25, strikes the paddles 17 and causes them to rotate, along with the shaft 16. In this way, a thorough agitation of the contents of the receiver 10 is obtained. The flow of water through the pipe 25 is governed by a hand valve 26 in the pipe. The treated water leaves the receiver 10 by way of a pipe 27, disposed about opposite to the inlet pipe 25. The pipe 27 has a transverse head 28. Hand valves 29 are interposed in the pipe 28, on opposite sides of the pipe 27. The pipe 27 opens into the settling basins 1, midway of the length of the baffles 8, as shown in Figs. 6 and 3.

The water, entering the settling basins 1, by way of the head 28, circulates or swirls in the basins, the speed of circulation being regulated by the valves 29. Water carrying a small amount of heavy suspended matter can be run through faster than water which carries a larger amount of lighter suspended matter. The water rises in the basins 1 and overflows into the check tanks 2, which segregate the water after it has been subjected to the settling process. The check tanks 2 are so designated, because they prevent the water from moving directly from the settling basins 1, to the outlets for the water, which will now be described.

Angular pipes 30 pass underneath the bottoms of the basins 1, and upwardly through the bottoms of the tanks 2, to communicate with the said tanks. At their outer ends, the pipes 30 communicate through the wall of the body 21 of the filter 20, with the space between the wall of the body and the wall of the tank 22 in the body 21.

Water passing into the body 21 of the filter 20 by way of the pipes 30, rises, as shown in Fig. 7, until it overflows into the tank 22, where material not removed in the basin 1 is caught by the sand or other filtering material 24, the water entering the outlet tubes 23. From the tubes 23, water leaves by a pipe 34, connected to the tubes 23, the flow through the pipe 34 being under the governance of a hand valve 31. The water passes from the pipe 34 into a clear water receptacle 32, the last of the suspended matter having been removed in the filter 20.

In the event that it is desired to flush out the filter 20, that can be done by closing the valve 31 in the pipe 34 and opening a valve 33 in a pipe 35, branched off from the pipe 34. Water flows through the pipe 35 and through the tubes 23, which then become nozzle tubes, the water passing upwardly through the filtering material 24 and overflowing into the body 21 of the filter 20. The washing water leaves the body 21 by way of a lateral pipe 36, located near the bottom of the body 21, a hand valve 37 being interposed in the pipe 36.

A pipe 38 is extended inwardly between the basins 1 and is provided at its inner end with a transverse head 39, opening into the basins 1, the pipe being connected to the tubes 23. Hand valves 40 are located in the head 39, on opposite sides of the extension 38 of the pipe 34.

Water enters the basins 1 by way of the pipe 38 and the head 39, and effects a thorough cleaning of the basins, the washing water leaving the basins by way of pipes 41, opening through the bottoms of the basins, below the check tank 2. The flow through the pipes 41 is regulated or stopped by hand valves 42, interposed in the said pipes, and located outwardly of the basins 1.

The operation of the device has been set forth hereinbefore, in connection with the piping or conduits, and need not be repeated at this place. The machine is so constructed that a supply of clear water is available readily, the water being treated chemically. The baffles 8 of Figs. 6 and 3 are important elements, in that they regulate the circulating motion of the water in the basins 1, a thorough precipitation of heavier suspended foreign matter in the water being brought about. If the water does not contain much suspended matter, the water may be permitted to travel by a short path from the pipe 28 to the check tank 2, the angle between the baffle 8 and the axis of the pipe being increased. As the angle is reduced, toward a little more than 90 degrees, the flow is caused to follow around the basin 1, the water follows a longer path, and there is more time for precipitation of the suspended matter.

What is claimed is:

1. In a water-treating apparatus, a settling basin having an outlet, a chemical receiver, a conduit leading from the receiver to the basin, an agitator mounted to rotate about a vertical axis, in direct contact with the bottom of the receiver, and a water inlet for the receiver, the inlet discharging directly upon the agitator to secure rotation thereof, the receiver having a central outlet in its bottom, the agitator being open for the passage of water therethrough, and to the outlet of the receiver.

2. In a water-treating apparatus, a settling basin having an outlet, a chemical receiver, an elbow secured to the central portion of the bottom of the receiver and having an internal bearing, an outlet conduit connected to the elbow and discharging into the basin, a lid removably mounted on the receiver, a shaft journaled in the lid and having its lower end removably stepped for rotation in the bearing, an agitator carried by the shaft and movable in direct contact with the bottom of the receiver, the agitator being open for the passage of liquid therethrough, and to the elbow, and a side water inlet for the receiver, the inlet discharging directly against the agitator, to secure rotation thereof.

JOHN BROWN FENDER.